(No Model.) 2 Sheets—Sheet 2.
R. JONES.
PLANT FENDER FOR PLOWS.
No. 437,651. Patented Sept. 30, 1890.
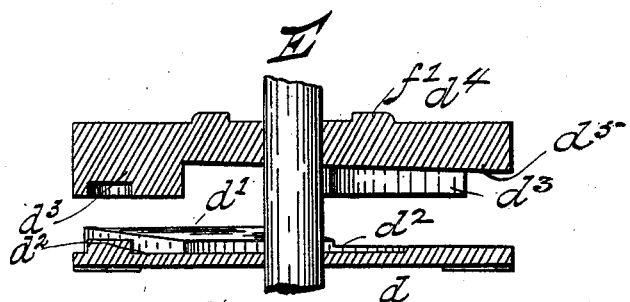
Fig. 6.
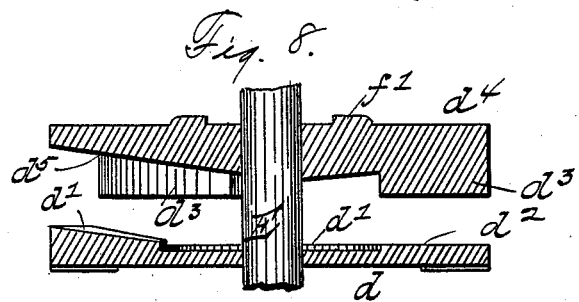
Fig. 8.
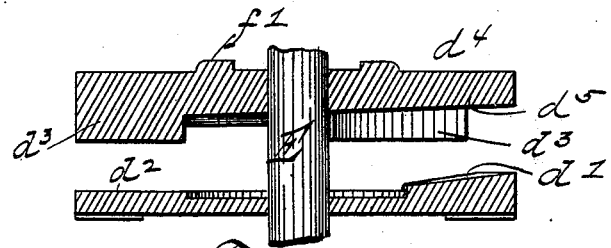
Fig. 7.
Fig. 9.
Witnesses Inventor
Reuben Jones.
By his Attorney

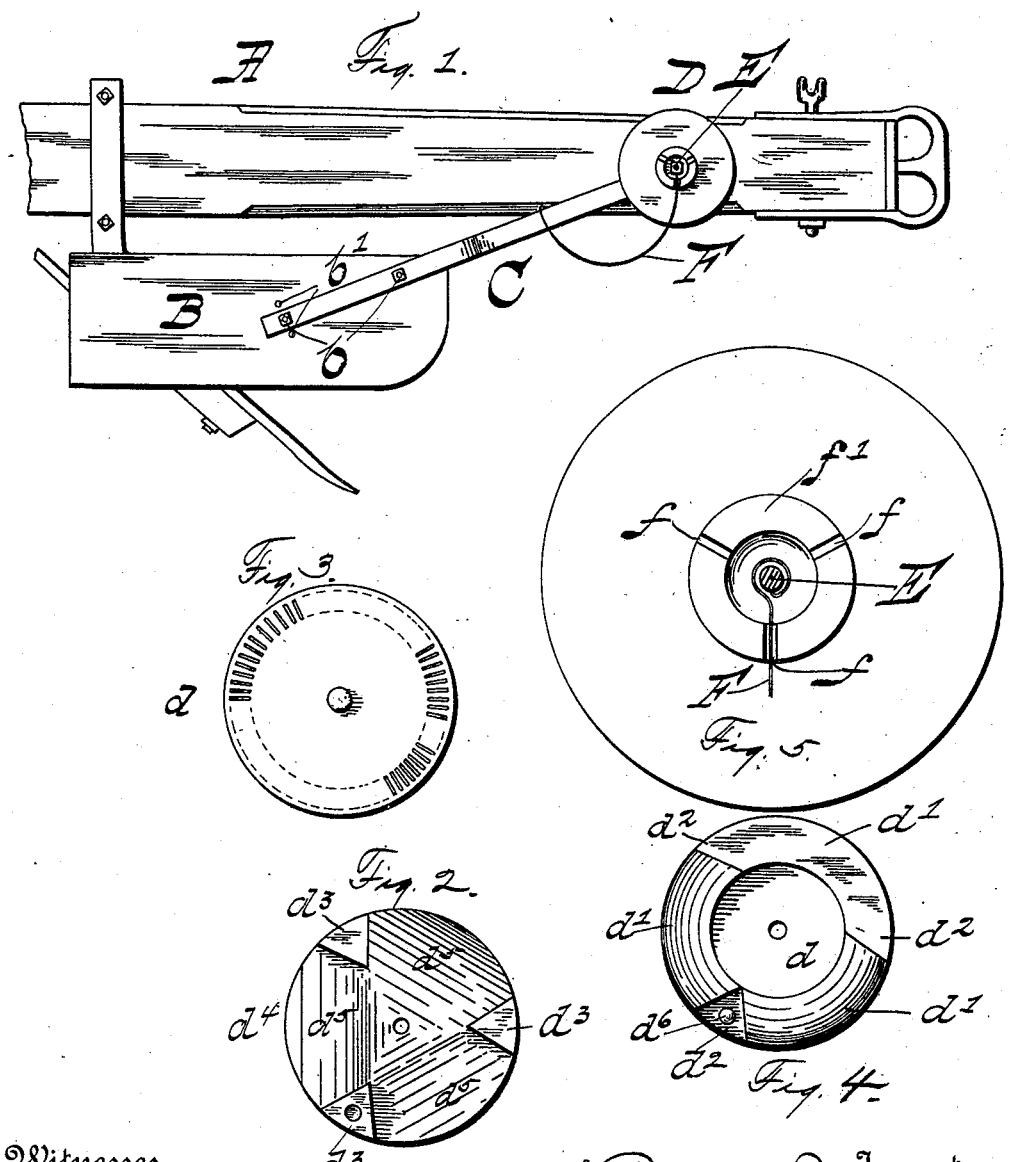

UNITED STATES PATENT OFFICE.

REUBEN JONES, OF ATLANTA, GEORGIA.

PLANT-FENDER FOR PLOWS.

SPECIFICATION forming part of Letters Patent No. 437,651, dated September 30, 1890.

Application filed July 16, 1890. Serial No. 358,959. (No model.)

*To all whom it may concern:*

Be it known that I, REUBEN JONES, a citizen of the United States of America, and a resident of Atlanta, in the county of Fulton and State of Georgia, have invented certain new and useful Improvements in Plant-Fenders for Plows; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to plow attachments, and more especially to that class of attachments which are used to protect certain plants while others are cut away, or to protect the plant while the plow is running alongside thereof by causing the ground to break and not lift near the plant, and also to prevent sticks and clods from being thrown on top of the plants by the operation of the plow, the object being to so improve such class of devices as to render them more easily and satisfactorily adjustable and more simple and durable in construction, the details of all of which construction will be hereinafter fully described and the parts thought to be new specifically claimed.

In the accompanying drawings, Figure 1 is a side elevation of a portion of a plow, showing the fender attached thereto in its position when the plow is cutting a medium depth. Fig. 2 is a detail view in side elevation of the inner side of the outer half of the swivel-adjusting plate which rests against the beam. Fig. 3 is a back view of Fig. 4, showing the notches or serrations which engage with the wood of the plow-beam, insuring stationariness of the swivel-plates. Fig. 4 is a detail view in side elevation of the outer side of the half of the swivel-plate which comes next the beam. Fig. 5 is an enlarged view of the outer side of the section of the plate shown in Fig. 2, showing the notched annular flange and the spring passing out through one of the notches which are provided for that purpose. Fig. 6 is a central section of the plates, showing them slightly separated in position, the inclined faces being those which hold the blade-carrying arm nearest the beam, Figs. 7 and 8 showing, respectively, the medium and extreme distance inclined faces. Fig. 9 shows the device duplicated on both sides of the beam, whereby a cotton-chopper is formed, a scraping-plowshare being employed in connection with the fenders.

In these figures like reference-marks indicate corresponding parts in the several views.

The plow A may be of any construction or character, and, indeed, the device to which this fender is applied is immaterial, so that a share of the usual kind for "plowing out" the hills or rows of plants be used.

The fender-plate B is of thin metal, preferably low-grade steel, although iron might be used, and it has secured to it by the bolts $b$ a forwardly-projecting arm C, of iron, by means of which it is connected to the adjusting device consisting of the swiveling plate D. One bolt $b$ is in the forward upper corner of the fender-plate B, and several holes $b'$ are punched in the said plate for the lower bolts $b$, in order that the lower edge of the said plate may be adjusted so as to be parallel with the ground independent of the height of the beam above the surface.

The swiveling plate D is composed of two sections, the section $d$ being placed on the bolt E, passing through the beam, with the serrated side shown in Fig. 3 contacting with the beam of the plow A, and having on its outer face, as best shown in Figs. 4, 6, 7, and 8, raised segmental portions $d'$ and lower portions $d^2$, into which enter the raised portions $d^3$ of the section $d^4$, (shown in Figs. 2, 6, 7, and 8,) the raised portion $d'$ on the section $d$ entering the depressions $d^5$ in the face of the plate $d^3$, a short pilot-lug $d^6$ entering the corresponding recess in the other section of the plate. The depressions $d^5$ in the face of the section $d^4$ set at different angles to the face of said plate and spring from about the center, all on the same plane, and pass to the circumference at different angles, the edge of the plate-section being a certain proportion thicker at the outer end of one depression than at the outer end of the next one to it, and the raised portions $d'$ on the face of the section $d$ coinciding in angle only being inclined to correspond with the said depressions and so thicker on the edge of the plate, thus leaving spaces with parallel sides into which the forwardly-extending arm C enters, the bolt E passing through an aperture in its end, and its angle to the beam being governed by the angle of the parallel sides of the opening in the plate D in which it happens to be seated, and distance of the blade B from the plowshare being governed by the angle of the arm C. To change the angle of the said arm the section $d^4$ of the plate D is removed and the arm C changed into another one of the inclined recesses between the two sections $d$ and $d^4$, the angle being changed in proportion to the angle of the said recess from a direction parallel to the beam, and the said plate D turned on the bolt E, which is then tightened, securing the two plates together and to the beam. The arm C has play in the recesses around the bolt E to allow it to automatically accommodate itself to any inequalities in the ground which it passes over, for allowing which movement it will be seen that the inner sides of the projections $d^3$ are not radial and are a greater distance apart than the arm C is in width.

I provide a spring F, which is to be employed, if desired, when the weight of the fender-plate and arm C is not sufficient to effect the return of the fender when it shall be pressed upwardly by a raised portion of the ground or a side motion of the plow. This spring has a loop passing around the screw E, as best shown in Fig. 5, and thence curving downwardly and backwardly and passing over the arm C, to which it is suitably secured, preferably by means of a hook resting on the top edge of the said arm. A second bearing place for the spring is had against the side of the proper one of the notches $f$ in the flange $f'$ on the section $d^4$ of the plate D.

In Fig. 9 is shown a plow-beam to which are applied two of these fenders—one on each side of said beam—and a scraper attached, by which the cotton in the rows which comes between the two fenders as the plow is propelled across the said rows will be "chopped" or cut out to bring the cotton to a proper stand, it having been found by experience in actual use that these fenders so arranged form a very desirable form of implement for the purpose just mentioned. No change of construction is required for the double use of the fender, as the necessary parts may be used by a simple reversal thereof.

Having thus described my invention, what I claim as new, and desire to secure by Letters Patent, is—

1. In a device of the class specified, the arm C, carrying a blade B and being clamped between the two sections of the swivel-plate D, secured to the beam A and formed of two sections $d$ and $d^4$, the sections $d$ having two or more facets inclined concavely and at different angles to the vertical side of the beam A, and the section $d^4$ being so formed on its inner face as to hold the said arm C against the desired one of the facets $d'$, for the purpose specified.

2. In a device of the class specified, the beam A, the blade B, the swivel-plate D, secured to the beam by the bolt E and formed of two sections, the arm C, adjustably secured at one end to the blade B and the other between the sections of the said swivel-plate, and the spring F, secured to the pin E and connected with the arm C, exerting a downward pressure on said arm, substantially as shown and specified.

In testimony whereof I hereunto affix my signature in presence of two witnesses.

REUBEN JONES.

Witnesses:
  A. P. WOOD,
  S. M. WOOD.